(12) United States Patent
Leith et al.

(10) Patent No.: US 6,382,298 B2
(45) Date of Patent: May 7, 2002

(54) MULTI-PIECE CRANKSHAFT CONSTRUCTION

(75) Inventors: Donald G. Leith, 7114 S. Elder Ct., West Bloomfield, MI (US) 48324; Jingming Huang, Novi, MI (US)

(73) Assignee: Donald G. Leith, West Bloomfield, MI (US)

(*) Notice: Subject to any disclaimer, the term of this patent is extended or adjusted under 35 U.S.C. 154(b) by 0 days.

(21) Appl. No.: 09/761,321

(22) Filed: Jan. 16, 2001

Related U.S. Application Data

(60) Continuation-in-part of application No. 09/533,917, filed on Mar. 23, 2000, now Pat. No. 6,318,443, which is a division of application No. 09/065,155, filed on Apr. 23, 1998, now Pat. No. 6,173,628.

(51) Int. Cl.$^7$ .............................. B22D 19/04; F16C 3/04
(52) U.S. Cl. .............................. 164/98; 74/598; 74/595; 29/888.08
(58) Field of Search ............................... 164/98, 91, 94, 164/95, 99, 100; 74/595, 598; 403/269; 29/888.08

(56) References Cited

U.S. PATENT DOCUMENTS

| | | | |
|---|---|---|---|
| 2,364,109 A | 12/1944 | Taylor | 29/6 |
| 4,191,238 A | 3/1980 | Pichl | 164/100 |
| 4,265,388 A | 5/1981 | Takahashi et al. | 228/135 |
| 4,319,498 A | 3/1982 | McWhorter | 74/595 |
| 4,382,390 A | 5/1983 | Jordan | 74/567 |
| 4,406,590 A | 9/1983 | Kessler | 417/360 |
| 4,493,226 A | 1/1985 | Andrione et al. | 74/598 |
| 4,494,286 A | 1/1985 | Kaufman | 29/156.5 A |
| 4,597,365 A | 7/1986 | Madaffer | 123/90.6 |
| 4,641,546 A | 2/1987 | Mettler | 74/598 |
| 4,829,642 A | 5/1989 | Thomas et al. | 29/6 |
| 4,829,954 A | 5/1989 | Morgado | 123/193 P |
| 4,835,832 A | 6/1989 | Arnold et al. | 29/523 |
| 4,838,116 A | 6/1989 | Saito et al. | 74/595 |
| 4,922,993 A | 5/1990 | Matsuo et al. | 164/104 |
| 5,088,345 A | 2/1992 | Kemmler et al. | 74/598 |
| 5,207,120 A | 5/1993 | Arnold et al. | 74/595 |
| 5,293,684 A | 3/1994 | Fry | 29/888.08 |
| 5,495,885 A | 3/1996 | Fowlkes et al. | 164/98 |
| 5,857,915 A | 1/1999 | Leith | 464/179 |
| 6,173,628 B1 | 1/2001 | Leith | 74/598 |
| 6,318,443 B1 * | 11/2001 | Leith | 164/98 |

FOREIGN PATENT DOCUMENTS

| | | |
|---|---|---|
| DE | 364 371 | 11/1922 |
| DE | 422 828 | 12/1925 |
| DE | 542 056 | 1/1932 |
| DE | 663 563 | 8/1938 |
| DE | 822 036 | 11/1951 |
| DE | 891 641 | 10/1953 |
| DE | 1 270 893 | 6/1968 |
| EP | 0 530 890 A1 | 3/1993 |
| FR | 763668 | 5/1934 |

* cited by examiner

Primary Examiner—M. Alexandra Elve
Assistant Examiner—Kevin P. Kerns
(74) Attorney, Agent, or Firm—Gifford, Krass, Groh, Sprinkle, Anderson & Citkowski, P.C.

(57) ABSTRACT

A multi-piece crankshaft having a main shaft with two ends adapted to rotate about its axis. A crankpin also has two ends and an axis parallel to but radially spaced from the axis of the main shaft. At least one counterweight extends between one end of the shaft and one end of the crankpin and this counterweight is formed by casting a liquid metal around the ends of the main shaft and crankpin in a molding chamber. In a modification of the crankshaft, a hollow crankpin is disposed within the mold such that each end of the crankpin is positioned within a mold cavity corresponding to a counterweight. Upon casting the liquid metal in the mold cavities forming the counterweights, the molten metal flows inwardly from both ends of the crankpin and joins together to form a continuous metal connection between the counterweights.

9 Claims, 4 Drawing Sheets

MULTI-PIECE CRANKSHAFT CONSTRUCTION

RELATED APPLICATIONS

This application is a continuation-in-part of U.S. patent application Ser. No. 09/533,917 filed Mar. 23, 2000, now U.S. Pat. No. 6,318,443, which is a divisional of U.S. patent application Ser. No. 09/065,155 filed Apr. 23, 1998, now U.S. Pat. No. 6,173,628, and entitled "Multi-Piece Crankshaft Construction".

BACKGROUND OF THE INVENTION

I. Field of the Invention

The present invention relates generally to crankshafts and, more particularly, to a method and apparatus for constructing a multi-piece crankshaft.

II. Description of the Prior Art

In a conventional crankshaft, the crankshaft includes a segmented main shaft having an axis aligned with the axis of rotation of the crankshaft. One or more crankpins are also provided at a position radially spaced from, but parallel to, the main shaft. The piston is then secured to each crankpin which rotatably drives the crankshaft about its axis of rotation.

Since the crankpins are radially offset from the axis of rotation of the crankshaft and attached to a piston, counterweights are conventionally provided for securing the main shaft to the crankpins so that the overall crankshaft has a balanced rotation. In many previously known crankshafts, the entire crankshaft is made from a single heavy body of cast metal which is then machined so that the main shaft, crankpins and counterweights are of a one-piece construction. Machining such crankshafts, however, is necessarily expensive which increases the overall cost of the crankshaft.

However, there have been crankshafts which are constructed from multiple pieces for low cost construction. Such crankshafts are oftentimes used in small two cycle engines although they can be used in other types of engines or compressors.

Typically, the counterweights are constructed from an inexpensive material, such as powdered metal or steel stampings, and the counterweight has holes formed through it corresponding to the position of the crankpin and main shaft. The crankpin and main shaft are then constructed from conventional round stock. The ends of the main shaft and crankpins are knurled, splined or otherwise deformed and pressed into the openings formed in the counterweight to thereby form the crankshaft.

One primary disadvantage of these previously known multi-piece crankshafts is that the main shaft and crankpins must be parallel to each other within very high tolerances. However, during the pressing operation, the main shaft and crankpins often become skewed relative to each other and the resulting crankshaft assembly must be either corrected by bending the crankpin and main shaft relative to each other or, in some cases, discarded as scrap. Furthermore, these prior art crankshafts were also subject to failure from push out and twisting of the shaft relative to the counterweight.

SUMMARY OF THE PRESENT INVENTION

The present invention provides a multi-piece crankshaft assembly and method for making the same which overcomes all of the above-mentioned disadvantages of the previously known multi-piece crankshaft constructions.

In brief, the crankshaft assembly of the present invention comprises a crankpin and a main shaft, both of which are cylindrical in cross-sectional shape. One end of both of the main shaft and crankpin includes an indentation, such as spline, knurling or the like.

The crankpin and main shaft are then placed in cylindrical positioning recesses in a mold having a mold cavity corresponding to the desired shape of the counterweight. With the crankpin and main shaft positioned within the mold positioning recesses, the ends of the crankpin and main shaft which includes the indentation are in registration with the mold cavity corresponding to the counterweight. Furthermore, the positioning recesses in the mold are machined with high precision which ensures parallelism between the main shaft and crankpin within the mold.

With the crankpin and main shaft positioned within the mold as described above, the mold cavity corresponding to the counterweight is then filled by pouring, injection or the like with a liquid thermosetting material, such as zinc. This liquid material not only fills the mold cavity but also the indentations in both the crankpin and main shaft. Consequently, upon hardening of the material, the material fills the indentations in the crankpin and main shaft, thus precluding either rotational or longitudinal movement between the counterweight and both the crankpin and main shaft.

Since the main shaft and crankpin are maintained parallel to each other within very small tolerances, once the liquid material has set, parallelism between the crankpin and main shaft is established for the completed crankshaft assembly.

In a modification of the present invention, the formed crankshaft includes two spaced counterweights with a crankpin extending between the counterweights. The crankpin, however, includes a throughbore. Furthermore, with the crankpin positioned in the mold, one end of the crankpin is positioned within a mold cavity corresponding to one counterweight while the opposite end of the crankpin is positioned within a second mold cavity corresponding in shape to a second counterweight.

Consequently, when the liquid metal is cast into the mold, the liquid metal not only fills the cavities corresponding in shape to the counterweights, but this liquid metal flow also flows inwardly from each end of the crankpin. The metal flow from the ends of the crankpin meet and flow together in substantially the center of the crankpin so that, upon cooling of the liquid metal, the cooled liquid metal forms a continuous connection from the first counterweight, through the interior of the crankpin and to the second counterweight thus rigidifying the connection between the counterweights through the crankpin.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF A PREFERRED EMBODIMENT OF THE PRESENT INVENTION

Figure 1:
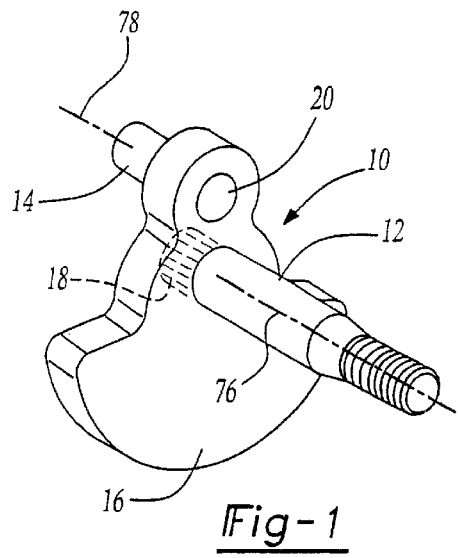
FIG. 1 is an elevational view illustrating a preferred embodiment of the present invention.

With reference first to FIG. 1, a preferred embodiment of a crankshaft 10 of the present invention is shown and comprises an elongated main shaft 12 adapted to rotate about its longitudinal axis 76. The crankshaft 10 further includes a crankpin 14 having a longitudinal axis 78 parallel to but radially spaced from the main shaft 12.

Still referring to FIG. 1, a counterweight 16 extends between one end 18 of the main shaft 12 and one end 20 of the crankpin 14. The counterweight 16 secures the crankpin 14 and main shaft 12 together in the well known fashion.

Figure 2:
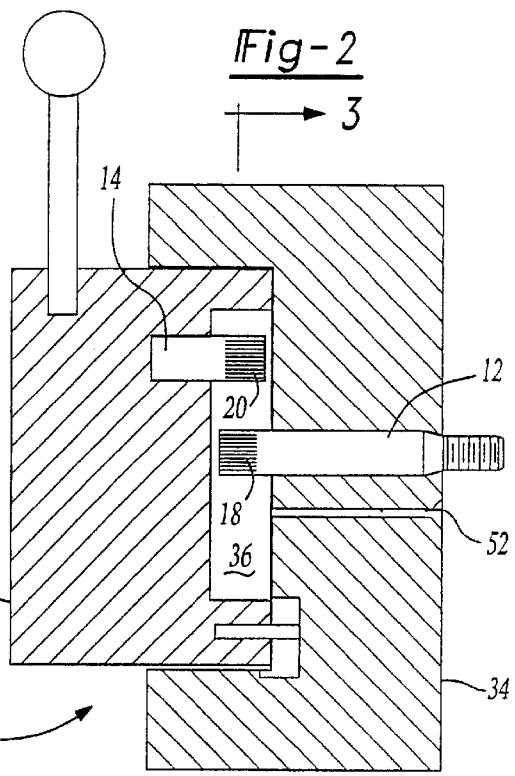
FIG. 2 is a sectional view illustrating a first step in constructing the preferred embodiment of the present invention.
Figure 3:
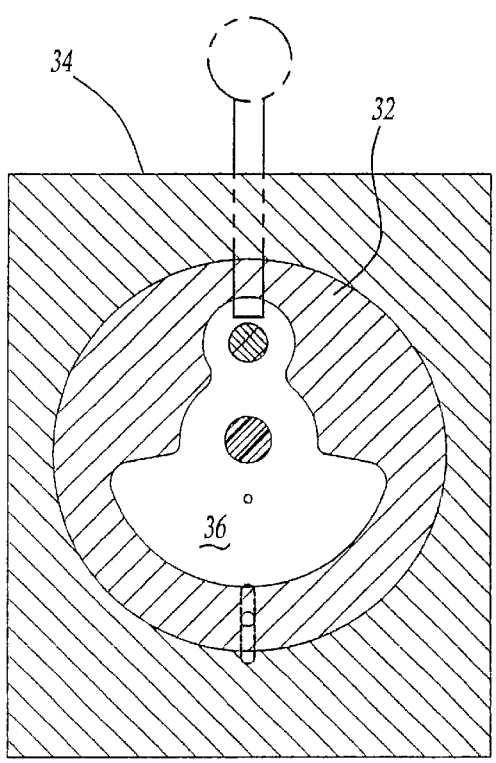
FIG. 3 is a cross-sectional view taken along line 3—3 in FIG. 2.
Figure 4:
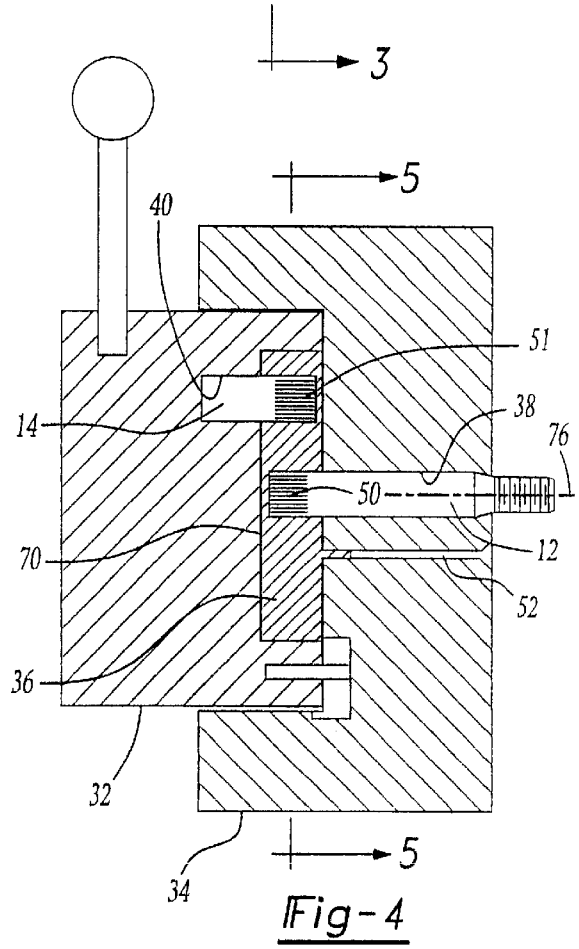
FIG. 4 is a view similar to FIG. 2, but illustrating a further step of the preferred method.

With reference now to FIGS. 2–4, the crankshaft 10 of the present invention is formed by casting the counterweight 16 from a thermosetting material 70 and preferably from liquid metal, such as zinc, around registering ends 20 and 18 of both the crankpin 14 and main shaft 12. As best shown in FIG. 2, a mold 30 having two mold halves 32 and 34 is provided which are movable between their closed position, illustrated in solid line in FIG. 2, and their opened position, illustrated in phantom line in FIG. 2. With the mold sections 32 and 34 in their closed position (FIG. 3) the mold sections 32 and 34 form a mold cavity 36 corresponding in shape to the counterweight 16.

Figure 5:
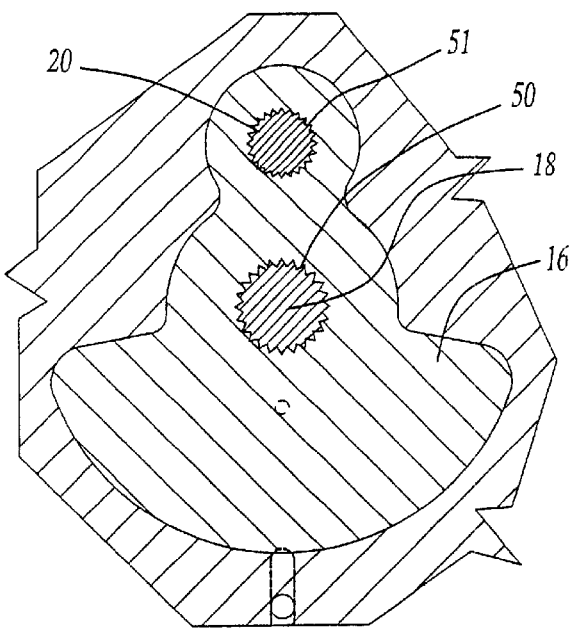
FIG. 5 is a sectional view taken substantially along line 5—5 in FIG. 4 and enlarged for clarity.

As best shown in FIG. 5, each mold section 32 and 34 (only section 34 illustrated in FIG. 4) includes an elongated cylindrical positioning recess 38 dimensioned to receive and position the main shaft 12 within the mold 30 such that its end 18 is in registration with the mold cavity 36. Similarly, a second elongated cylindrical recess 40 is also provided in each mold section 32 and 34 and these recesses 40 are dimensioned to receive and position the crankpin 14 such that its end 20 is also positioned in registration with the mold cavity 36.

The recesses 38 and 40 for positioning the main shaft 12 and crankpin 14, respectively, are machined in the mold sections 32 and 34 such that the recesses 38 and 40 are parallel to each other within very small tolerances. Furthermore, as best shown in FIG. 3, the mold section 32 is generally cylindrical in shape and pivotal about the axis of the main shaft 12 for a reason to be shortly described.

Figure 7:
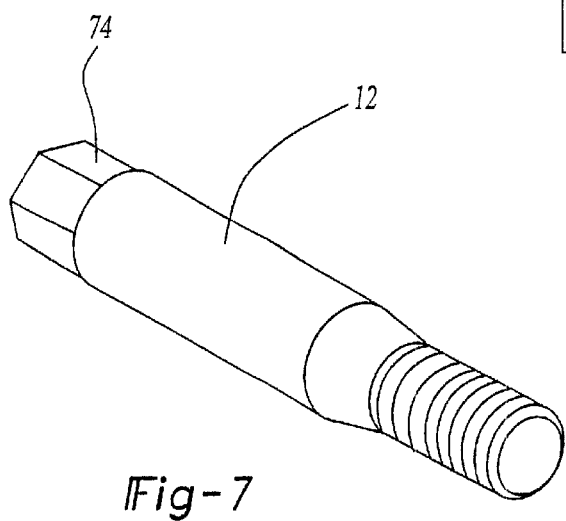
FIG. 7 is a view of a shaft, but illustrating a modification thereof.

With reference now to FIG. 5, the ends 18 of the main shaft 12 includes at least one indentation 50. The indentation 50 can comprise, for example, splines, a knurled portion, a polygonal cross-section 74 as shown in FIG. 7 or the like.

However, at least one portion of the circular outer periphery of the end 18 of the main shaft 12 is non-circular in shape.

The end 20 of the crankpin 14 also has at least one indentation 51 (FIG. 5) which is similar to indentation 50 on the main shaft 12. Thus a further description thereof is unnecessary.

With the main shaft 12 and crankpin 14 positioned in the mold sections 32 and 34 as shown in FIG. 2, a liquid thermosetting material 70, such as liquid metal, is introduced through a sprue 52 such that the liquid material, preferably zinc, fills the mold chamber 36 which corresponds in shape to the counterweight 16. Any conventional means, such as pouring, injection molding or the like can be used to introduce the liquid material into the chamber 36. Furthermore, as shown in FIG. 4, the liquid material not only encases the registering ends 18 and 20 of the main shaft 12 and crankpin 14, respectively, but the liquid material 70 also flows into the indentations 50 and 51 formed in the shaft and crankpin ends 18 and 20. A small amount of material also hardens in the sprue 52 next to the mold chamber 36.

Figure 6:
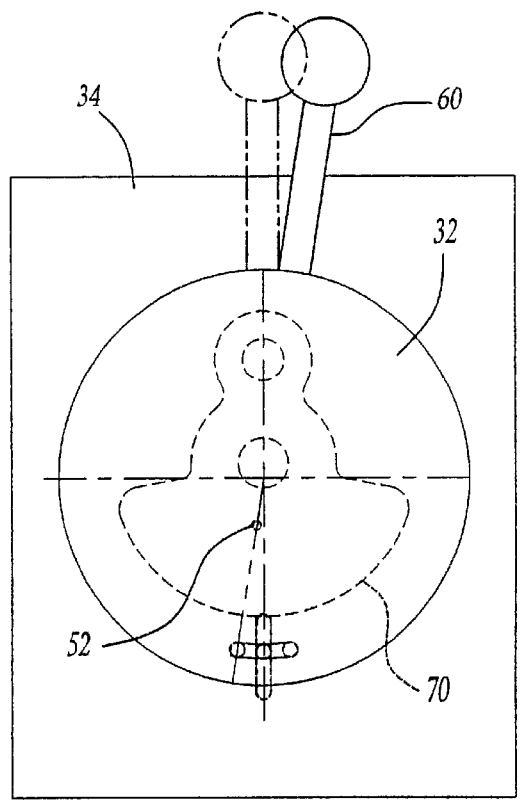
FIG. 6 is a diagrammatic view illustrating a further step in the preferred method.

With reference to FIG. 6, once the liquid material has set or cooled, a handle 60 attached to the mold section 32 pivots the mold section 32, as shown in phantom line, relative to the mold section 34 and in doing so, breaks the thermoset material contained in the sprue 52 from the counterweight 16. The mold sections 32 and 34 are again opened (FIG. 2) thus allowing the now completed crankshaft 10 to be removed from the mold 30. Furthermore, since the main shaft 12 and crankpin 14 were maintained parallel to each other during the entire molding operation, parallelism between the main shaft 12 and crankpin 14 is ensured upon completion of the crankshaft assembly.

The provision of the indentation(s) 50 and 51 on the ends 18 and 20 of the main shaft 12 and crankpin 14, respectively, ensures against movement, either rotational or longitudinal, of the main shaft 12 and crankpin 14 relative to the counterweight 16 during operation of the crankshaft 10.

Figure 11:
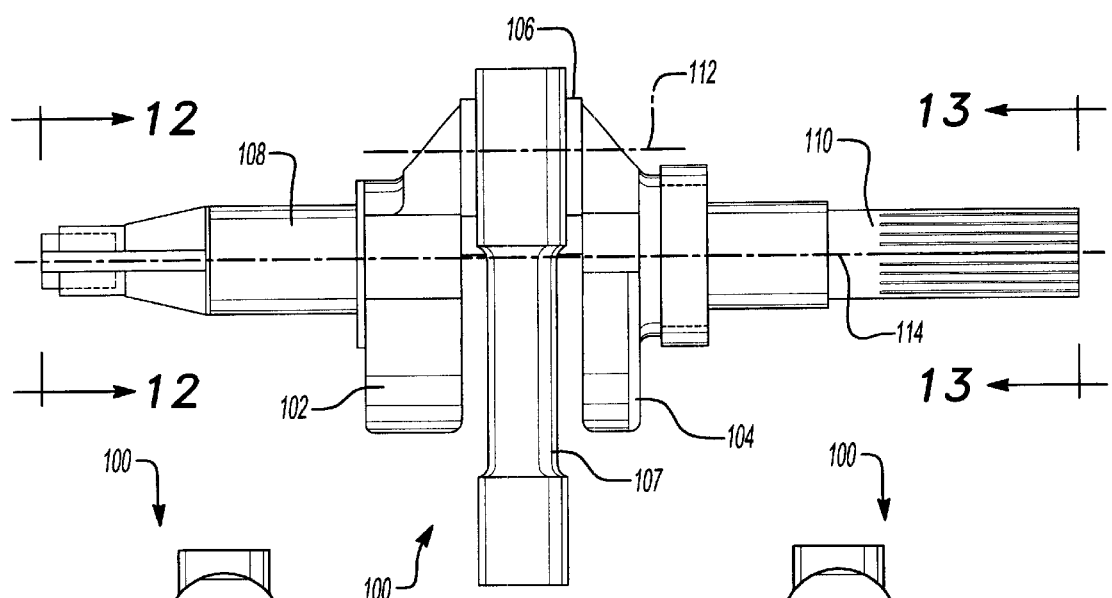
FIG. 11 is a side view of the completed crankshaft of FIGS. 8–10.
Figure 12:
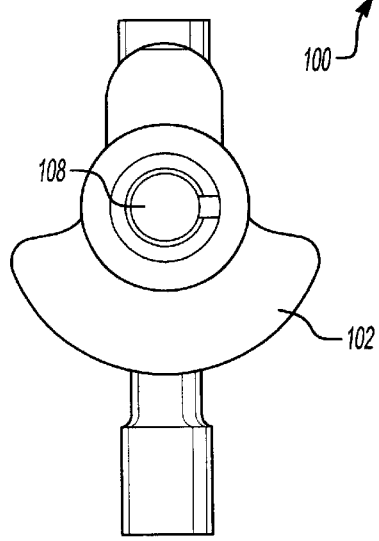
FIG. 12 is a view taken along line 12—12 in FIG. 11.
Figure 13:
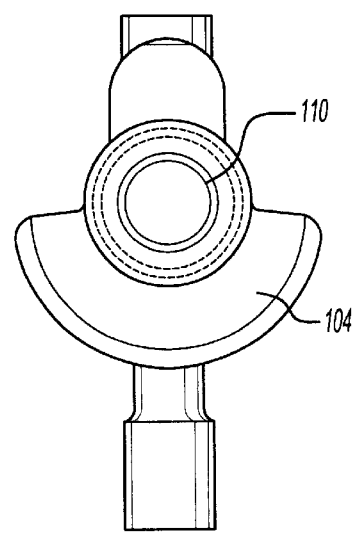
FIG. 13 is a view taken along line 13—13 in FIG. 11.

With reference now to FIGS. 11–13, a further preferred embodiment of the present invention is there shown in which a crankshaft 100 includes two spaced apart counterweights 102 and 104 with a crankpin 106 extending between the counterweights 102 and 104. The crankpin 106 is made of a hard material, such as steel, and a connecting rod 107 is rotatably mounted around the crankpin 106. A first shaft segment 108 extends axially outwardly from one counterweight 102 while a coaxial shaft segment 110 extends axially outwardly from the other counterweight 104. In the conventional fashion, an axis 112 (FIG. 11) of the crankpin 106 is parallel to, but radially spaced from, an axis 114 of the shaft segments 108 and 110.

Figure 8:
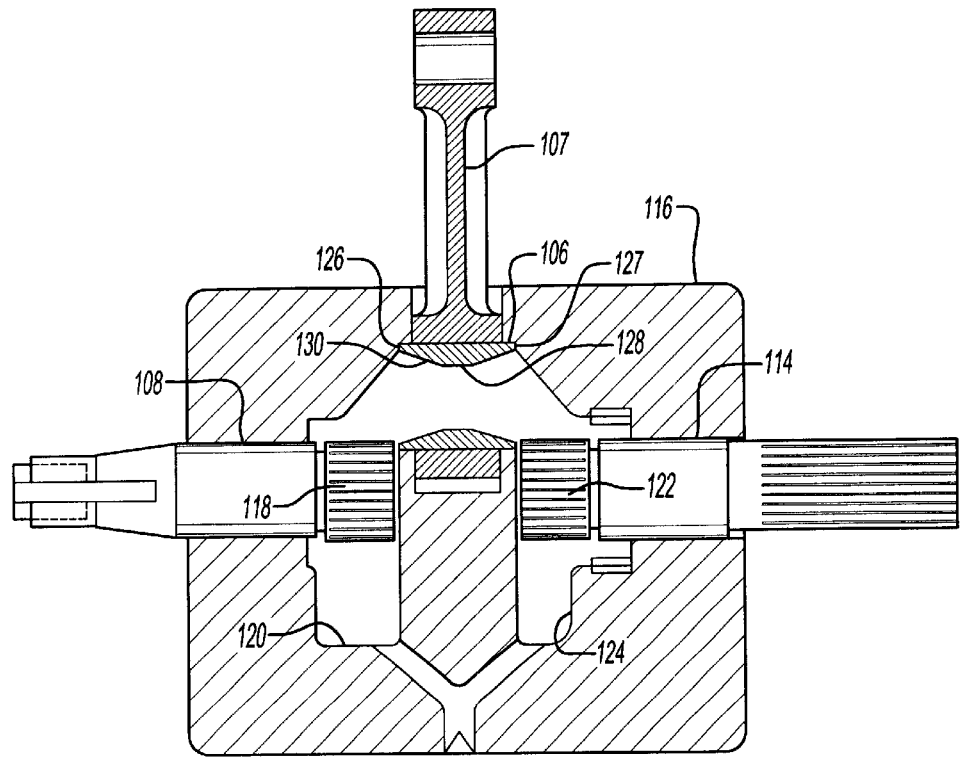
FIG. 8 is a longitudinal view illustrating a further modification of the preferred embodiment of the invention prior to the casting of liquid metal.
Figure 9:
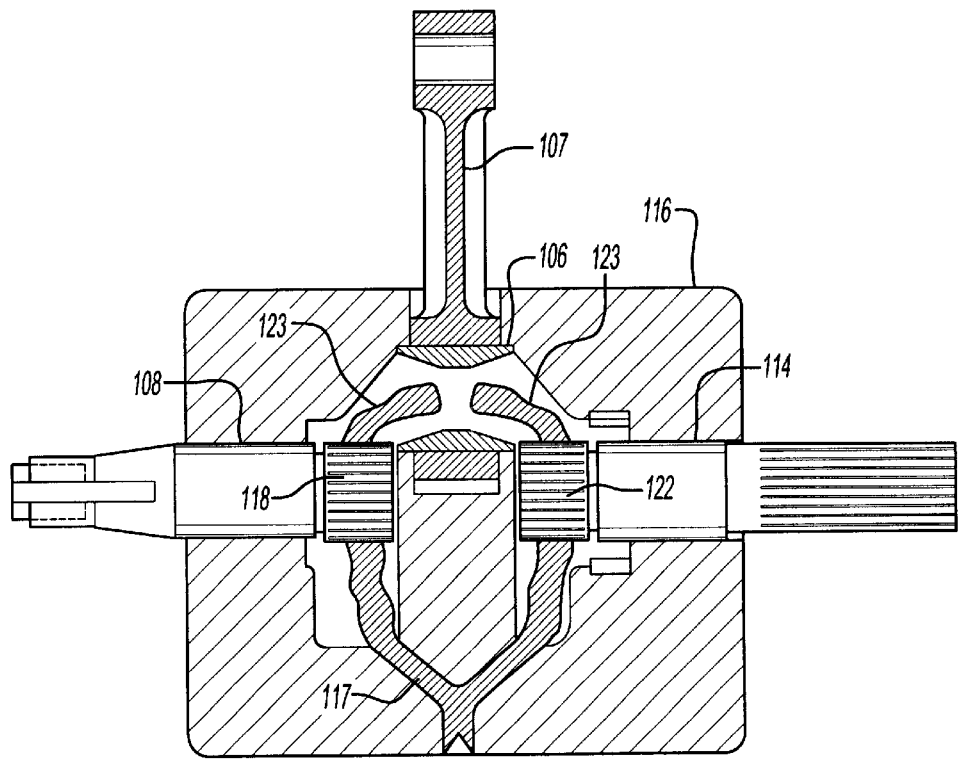
FIG. 9 is a view similar to FIG. 8, but illustrating the further modification at a midpoint of the casting operation.
Figure 10:
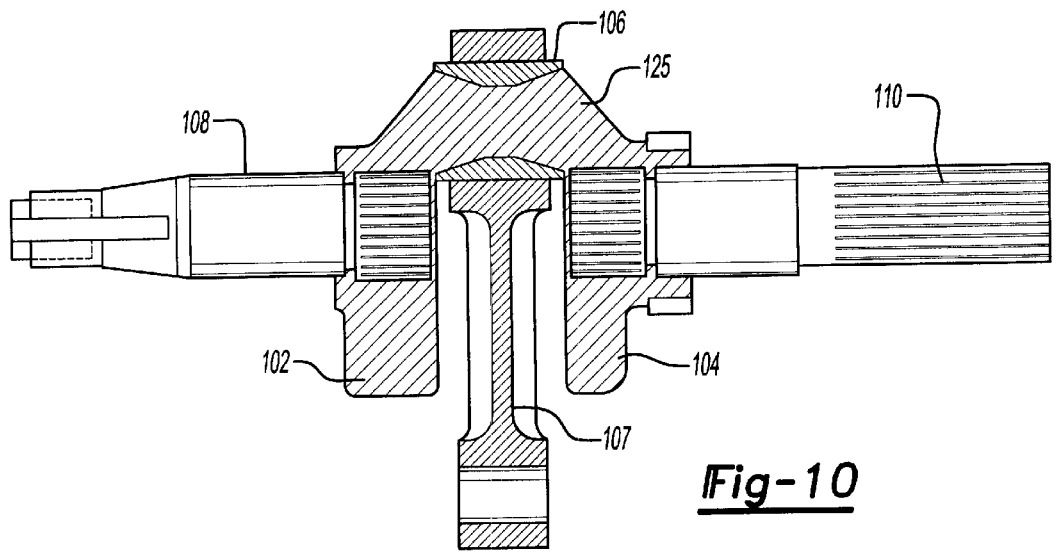
FIG. 10 is a view similar to FIGS. 8 and 9 but illustrating the further modification of the present invention following the casting operation.

With reference now to FIGS. 8–10, the manufacture of the crankshaft 100 will there be described in greater detail. With reference first to FIG. 8, the shaft segments 108 and 114 are positioned within a mold 116 so that one end 118 of the shaft segment 108 is positioned within a mold cavity 120 corresponding in shape to a first counterweight 102. Similarly, one end 122 of the second shaft segment 110 is positioned within a second mold cavity 124 corresponding in shape to the shape of a second counterweight 104. Both ends 118 and 122 of the shaft segments 108 and 110, furthermore, include an external indentation, such as a knurled surface.

Still referring to FIG. 8, the crankpin 106 with the attached connecting rod 107 is also positioned within the mold 116 so that the opposite ends 126 and 127 are positioned, i.e. open to, respectively within the mold cavities 120 and 124. Furthermore, the crankpin 106 includes a throughbore 128 and this throughbore 128 includes an outwardly flared portion 130 at each end.

With reference now to FIG. 9, with the shaft segments 108 and 110 as well as the crankpin 106 positioned within the mold 116 in the previously described fashion, liquid metal 117, such as liquid zinc, is cast into the mold cavities 120 and 124. The liquid metal not only fills the indentations at the ends 118 and 122 of the shaft segments 108 and 110, but also flows inwardly from each end 126 and 127 of the crankpin 106 as shown at 123. As the liquid metal continues to fill the mold cavities 120 and 122 as well as the throughbore 128 of the crankpin 106, the liquid metal flowing inwardly from the ends of the crankpin 106 intermix at an intermediate point of the crankpin 106. Consequently, upon cooling of the liquid metal, a continuous, one piece metal connection is formed between the counterweights 102 and 104 through the crankpin 106 as shown at 125 in FIG. 10.

Liquid metal, such as liquid zinc, inherently shrinks somewhat upon cooling. Such shrinkage of the liquid metal within the crankpin bore 128 also shrinks axially with respect to the crankpin 106. Consequently, the axial shrinkage of the liquid metal in the crankpin bore 128 forms an axial compressive force on the crankpin 106 due to the outwardly flared ends 130 of the crankpin 106 thus rigidifying the connection between the counterweights 102 and 104.

Since the crankpin 106 is constructed of a hard metal, such as steel, it is possible to form the counterweights 102 and 104 from a much less expensive material, such as zinc, during the casting operation without forfeiting the hardness of the crankpin 106 outer bearing surface.

From the foregoing, it can be seen that the present invention provides both a crankshaft and a method for constructing a crankshaft which is not only inexpensive, but also ensures a high degree of parallelism between the main shaft and crankpin upon completion of the assembly.

Having described my invention, however, many modifications thereto will become apparent to those skilled in the art to which it pertains without deviation from the spirit of the invention as defined by the scope of the appended claims.

I claim:

1. A crankshaft comprising:

a shaft having two shaft segments, each shaft segment having two ends and an axis, said axes of said shaft segments being coaxial to form a shaft axis, said shaft adapted to rotate about said shaft axis, a crankpin having two ends and an axis parallel to and radially spaced from the shaft axis, said crankpin having a throughbore extending between its ends, a first counterweight extending between one end of one of said shaft segments and one end of said crankpin, a second counterweight extending between one end of the other of said shaft segments and the other end of said crankpin, said one end of said shaft segments each having an indentation, said counterweights being formed by casting a liquid metal around said one ends of said shaft segments and said ends of said crankpin wherein said liquid metal fills said indentations in said shaft segments and said crankpin throughbore so that, upon hardening, the metal locks said counterweight to said shaft segments and said crankpin and forms a one-piece metal connection between said counterweights through said crankpin throughbore.

2. The invention as defined in claim 1 wherein each said indentation comprises at least one spline.

3. The invention as defined in claim 1 wherein each said indentation comprises a knurled portion of said shaft segments.

4. The invention as defined in claim 1 wherein said counterweights are constructed of zinc.

5. The invention as defined in claim 1 wherein said crankpin throughbore includes a radially outwardly flared portion at each end.

6. The invention as defined in claim 1 wherein said crankpin comprises steel.

7. A method for constructing a crankshaft having a pair of coaxially aligned and spaced apart shaft segments, a tubular crankpin having a throughbore open at each end and parallel to but radially spaced from said shaft segments, and a first counterweight extending between one end of one of said shaft segments and one end of said crankpin and a second counterweight extending between one end of the other of said shaft segments and the other end of said crankpin, comprising the steps of:

placing said crankpin and said shaft segments in a mold so that said shaft segments are coaxial and said crankpin and said shaft segments are spaced apart and parallel to each other and so that one end of one of said shaft segments and one end of said crankpin are positioned in a first mold chamber corresponding in shape to one of said counterweights, and so that one end of the other of said shaft segments and the other end of said crankpin are positioned in a second mold chamber corresponding in shape to the other of said counterweights, filling said mold chambers with a molten thermosetting material such that said material encases said ends of said shaft and said crankpin and flows inwardly from the ends of the crankpin throughbore until said molten material meets and intermixes at a midpoint of said crankpin throughbore, allowing said material to harden to form the counterweights and a one-piece connection between said counterweights and through said crankpin, and removing said crankpin, said shaft and said counterweight from the mold.

8. The invention as defined in claim 7 wherein said material comprises zinc.

9. The invention as defined in claim 7 and further comprising the step of forming an indentation on said one ends of said shaft segments prior to said placing step.

* * * * *